United States Patent
Shteinhauz (10) Patent No.: US 6,609,074 B2
(45) Date of Patent: Aug. 19, 2003

(54) TIRE UNIFORMITY PREDICTION USING BALANCE AND LOW SPEED UNIFORMITY DATA

(75) Inventor: Gregory David Shteinhauz, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 136 days.

(21) Appl. No.: 09/817,983

(22) Filed: Mar. 27, 2001

(65) Prior Publication Data
US 2002/0177964 A1 Nov. 28, 2002

(51) Int. Cl.[7] .................... B24B 49/00; G06F 15/00
(52) U.S. Cl. .................... 702/75; 73/146; 451/254
(58) Field of Search .................... 702/41, 75, 76, 702/114; 73/146, 660, 669; 451/254, 258

(56) References Cited

U.S. PATENT DOCUMENTS

| | | |
|---|---|---|
| 5,396,438 A | 3/1995 | Oblizajek |
| 6,065,331 A | 5/2000 | Fukasawa |
| 6,139,401 A * | 10/2000 | Dunn et al. .................... 451/10 |
| 6,257,956 B1 * | 7/2001 | Shteinhauz et al. .................... 451/8 |

* cited by examiner

Primary Examiner—Kamini Shah
(74) Attorney, Agent, or Firm—Howard M. Cohn (57) ABSTRACT

Methods and apparatus for predicting tire uniformity, preferably a harmonic component of force variation for a production tire, preferably when operating at a high speed, and also method and apparatus for manufacturing tires and controlling the manufacturing of tires in response to quality control based on a comparison of a production tire's predicted uniformity versus predetermined criteria. A production tire's predicted tire uniformity is determined by a calculation using transfer functions applied to production tire measurement data from factory floor testing equipment which includes a factory floor balance checker and a factory floor tire uniformity machine. The transfer functions are determined by calculations involving a combination of measurements on a tire sample which preferably comprises one or more tires of the same construction as the production tire for which predictions are desired. The combination of measurements includes measurements on a factory floor balance checker, on a factory floor tire uniformity machine, and on a test lab tire uniformity machine. The test lab tire uniformity machine is preferably operated at a speed higher than the factory floor tire uniformity machine, and most preferably at a speed approximately equal to the speed at which the predicted uniformity is desired.

17 Claims, 5 Drawing Sheets

TIRE UNIFORMITY PREDICTION USING BALANCE AND LOW SPEED UNIFORMITY DATA

TECHNICAL FIELD OF THE INVENTION

The present invention relates to methods of measuring pneumatic tire uniformity and, more particularly, to methods of predicting high speed tire uniformity.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of sufficient amplitude will cause force variations on a surface, such as a road, against which the tires roll producing vibration and noise. When such force variations exceed an acceptable maximum level, the ride and handling of a vehicle utilizing such tires will be adversely affected. It is known that the magnitudes of the force variations change with the speed of tire rotation, generally (but not always) increasing in magnitude with speed, therefore a vehicle operator's perception of tire quality (and vehicle ride) will be most influenced by the force variations occurring at high speeds such as "highway speeds" of, for example, 100 kilometers per hour (Kph) and higher. Accordingly, purchasers of tires, especially large volume purchasers such as vehicle manufacturers ("OEMs"), would prefer to know and specify maximums for high speed force variations on purchased tires. Unfortunately, direct measurement of high speed force variations on tires is difficult and expensive, therefore the industry has devised a variety of equipment and methods for predicting high speed tire performance (uniformity, force variations) based on statistical sampling and on simpler measurements primarily including "low speed" tire uniformity measurements, and possibly also measurements of tire balance.

During the typical tire manufacturing process, factory floor measurements of tire uniformity are performed on tire uniformity machines ("TUMs") which are used to monitor the quality of the tire production process and may guide or incorporate corrective measures such as grinding to improve the balance and uniformity of a tire. A factory floor TUM is a low speed unit, typically operated at 60 rpm (revolutions per minute) which corresponds to less than 10 Kph for a typical passenger car tire. The low speed TUM is also known in the industry as a "low speed uniformity machine" or "LSU". In general, a tire uniformity machine subjects a tire to normal conditions of mounting, inflation, load, and rotation (at low speed) while collecting measurement data on variations of force, and sometimes also deflection (e.g., "runout"), and instantaneous angular velocity. A tire uniformity machine typically includes an assembly for rotating a test tire against the surface of a freely rotating loading wheel. In such an arrangement, the loading wheel is acted upon in a manner dependent on the forces exerted by the rotating tire and those forces are measured by appropriately placed measuring devices, connected to the supporting structure of the loading wheel. When a tire being tested yields unacceptable results, shoulder and center rib grinders are used to remove a small amount of the tire tread at precisely the location of non-uniformities detected by the measuring devices. As the tire is rotated, it is measured and ground simultaneously. In a sophisticated, low speed production tire uniformity machine, such as a Model No. D70LTX available from the Akron Standard Co. of Akron Ohio, the force measurements are interpreted by a computer and rubber is removed from the tire tread using grinders controlled by the computer.

Once a tire undergoes correction for force variations in a TUM, it is common manufacturing practice to remove the tire from the TUM and place the tire in a balance machine to measure the amount of imbalance of the tire. Typically, the tires are mounted in the balance machine in a manner similar to that of the tire uniformity machine and inflated to a preset pressure. Then, the static (single-plane) and couple (two-plane) imbalances are measured by one of a variety of well-known methods. When a tire is found to be imbalanced to an unacceptable level, the tire is ordinarily scrapped.

The assumption generally made in the art is that the factory floor measurements of tire quality are reasonably related to high speed tire performance, so that placing "suitable" limits on tire imbalance and on low speed force variations will produce tires that have acceptable high speed performance. A common technique for establishing the suitable limits is to measure individual tires at both high speed and low speed and then mathematically relate the two measurements. In this technique's simplest conceptual form, a tire is found which exhibits the maximum allowable high speed force variation, and then the magnitude of the low speed force variation measured for the same tire is used as the suitable limit. It is known that the relationship between high speed force variation and low speed force variation can be different for different tire constructions (designs) and for different low and high speed tire uniformity machines, so this technique must be repeated for each variation of tire and machine. In many cases, it is desired to be able to predict the magnitude of high speed force variations from factory floor measurements, and so inventive effort, detailed hereinbelow, has been applied to the determination of mathematical equations (including "transfer functions") to relate various combinations of factory floor measurements to predicted high speed force variations.

Before discussing transfer functions and prediction methods, it is important to understand the various measurements that are involved. Tire performance in terms of vibration (and noise caused by tire vibration) at any given tire rotational speed is substantially determined by tire uniformity and is directly indicated by the magnitude of force variations which occur as the tire rolls under load on a surface. If the surface is a tire uniformity machine load wheel that is instrumented to measure forces, then the forces can be measured to report a direct measurement of the tire's vibration performance (i.e., uniformity) for the tire speed at which it is measured. Since high speed tire uniformity measurements are impractical for large volume factory floor use, low speed TUM measurements must be utilized to predict high speed measurements. The problem is that with low speed TUMs, certain force variations are either too small to be accurately measured at low speeds, or else a measurement of a particular low speed force variation is not sufficient to predict the high speed variation of that force. For these certain force variations, low speed force measurements must be supplemented or replaced with other measurements including, for example, measurements of: other types of force variation, tire imbalance, tire surface displacement (runout), tire stiffness variation, tire angular velocity variation and load wheel angular velocity variation.

In the art, forces on a tire which is rolling under load on a load bearing surface are commonly broken down into three orthogonal components which will be primarily referred to herein as: radial, lateral, and tangential. Radial forces act in the tire's radial direction, i.e., perpendicular to the tire's axis of rotation. Radial forces are strongest in the vertical direction (e.g., wheel "hop") as the tire interacts with the load bearing surface, but may also have a horizontal (fore-aft, or "surge") component due to, for example, the radial centrifugal force of a net mass imbalance in the rotating tire. Lateral forces act in a direction parallel to the tire's axis of rotation, and generally occur where the tire's surface touches the load bearing surface. Lateral force causes either tire wobble or a constant steering force. Tangential force, or fore-aft force is experienced at the surface of contact between tire and load bearing surface in a direction both tangential to the tire's outer circumference (e.g., tread surface) and perpendicular to the tire's axis of rotation (thus also perpendicular to the radial and lateral forces). Tangential force variations are experienced as a "push-pull" effect on a tire, which can be analogized to the sensation of a wheel barrow traveling over a bump in the road, i.e. increased force as the wheel barrow is pushed up the bump and decreased force as the wheel barrow travels down the bump. Investigations have shown that there are multiple mechanisms active in causing tangential force variation.

Of the three types of force (radial, tangential and lateral), tangential force variation (TFV) is the most speed dependent, and is practically unmeasurable on a typical production low speed tire uniformity machine, which operates at a speed such as 60 rpm. Instead, tangential force variation can only be effectively measured at highway speeds using a high speed, laboratory tire uniformity machine, such as a Model HSU-1064, available from the Akron Standard Co. of Akron Ohio. The high speed TUM is also known in the industry as a "high speed uniformity machine" or "HSU".

Variations of the three types of force are known to be caused by nonuniformities (asymmetries, imperfections) in the tire (and/or in the wheel and axle hub upon which the tire is mounted). Other sources of force, such as friction drag, are also known but are not a concern in this discussion of tire uniformity. Non-uniformities in the tires can be generally classified as mass asymmetry, dimensional asymmetry, and stiffness asymmetry. A tire that is asymmetric from axial side to axial side may produce lateral forces, and asymmetry between angular points around the tire's rotational axis will cause variations in force as the tire rotates. An imperfection which occurs only once around the tire, for example a single bump on the tire tread, may cause a strong force variation with a period which matches the period of the tire's revolution, i.e., once per revolution when the bump hits the load bearing surface. Superimposed on the measurement of this strong force variation may be another force measurement due to the centrifugal force of the bump and having a magnitude which will vary sinusoidally with the same period as the tire revolution. A second bump on the tire tread would produce a second peak in a curve plotting the force measurements versus time (signal). Obviously the force signal can rapidly become quite complex. Through the well-known mathematical process of Fourier Transform calculation, even very complex force variation signals can be mathematically represented as a sum of components wherein each component is a sine characterized by its own amplitude and phase. The component of the Fourier equation, which has the same period as the tire revolution, i.e., has a frequency of one cycle per revolution of the tire, is referred to as the "first harmonic". For example, if the tire is rotating at 60 revolutions per minute, then the first harmonic is a sine signal with a frequency of 60 cycles per minute (1 cycle per second, or 1 Hertz). The component of the Fourier equation that has half the period of the tire revolution (twice the revolution frequency) is the "second harmonic", and so on.

Since there are three orthogonal forces being considered, there are three separate force variation signals: radial force variation (RFV), lateral force variation (LFV), and tangential force variation (TFV). Fourier transformations of each of the three force variation signals will produce families of harmonic components (some of which may have a zero magnitude) for each of the three signals. The first harmonic of radial force variation can be abbreviated as "R1H" for Radial $1^{st}$ Harmonic; the first harmonic of lateral force variation can be abbreviated as "L1H" for Lateral $1^{st}$ Harmonic; and the first harmonic of tangential force variation can be abbreviated as "T1H" for Tangential $1^{st}$ Harmonic. Similarly, second harmonic components can be abbreviated as R2H, L2H, and T2H, for radial, lateral and tangential $2^{nd}$ harmonics, respectively; and so on for third and higher harmonics of the three force variations.

As alluded to hereinabove, tire imbalance (mass asymmetry) is a contributing factor in certain tire force variation measurements. Tire imbalance can produce significant force variations, but fortunately is easily measured, even at relatively low tire revolution speeds (e.g., about 300 rpm), although tire balance measuring machines suitable for factory floor use are available which can be used with much higher rpm speeds than the factory floor TUMs.

Essentially, two separate physical phenomena contribute to the imbalance of a tire, static imbalance and couple imbalance. Static imbalance is the net result of centrifugal forces created by non-uniformities in the distribution of tire mass (mass asymmetry) about the rotational axis of the tire. As an element of tire mass rotates about an axis, centrifugal force is experienced by the element, which tends to pull it away from the center of rotation (axis), the magnitude of this centrifugal force being:

$$F = m \times \omega^2 \times r$$

wherein m=mass of the element, $\omega$=rotational velocity, and r=radius of the element's location relative to the axis of rotation. If the mass of the tire is distributed equally about the center of rotation, the centrifugal force on each of the elements of tire mass would be negated by an equal and opposite force acting upon an element of tire mass located on the opposite side of the center of rotation, and thus no net centrifugal force would act upon the tire during rotation. However, when the distribution of tire mass is nonuniform, so that there are elements of differing mass opposing each other, or opposing elements of equal mass which are located at differing radial distances from the center of rotation, the centrifugal force on these elements is not canceled by the opposing force acting on the opposing element of tire mass located on the opposite side of the center of rotation. In such cases, the tire experiences a net centrifugal force acting through the element of either greater tire mass or of equal mass located at a greater distance from the center of rotation. These net centrifugal forces cause a static imbalance about the center of rotation of the tire. Static imbalance is also known as single plane imbalance, since the term is restricted to mass asymmetries which occur within a single circumferential plane of the tire (a plane perpendicular to the tire's axis of rotation).

Couple imbalance is caused by the above described mass distribution non-uniformities, or mass imbalances/asymmetries, which occur in multiple circumferential planes, thereby creating net moments about an axis in a plane which is through the axial centerline of the tread and perpendicular to the axis of rotation of the tire. The magnitude of the moment equals the net force acting on the mass non-uniformity, or the imbalance force, multiplied by the axial distance of the mass non-uniformity from the centerline of the tread (and thus the axis located in the plane through the tread centerline). This moment M can be expressed as:

$$M = F \times d = (m \times \omega^2 \times r) \times d$$

wherein variables m, ω, and r are the properties described above and d=axial distance between the mass non-uniformity and the centerline of the tread. The effect of such moments is that the tire tends to wobble, as the effective axis of rotation nutates. Couple imbalance is also referred to as "two plane imbalance" because the sum of all the couple imbalances in a tire can be resolved into a single net moment determined by two mass elements with a first element of mass m1 located at a certain angle and radius ($\phi1, r1$) in a first circumferential plane located at a distance d1 from the centerline of the tread, and a second element of mass m2 located at a certain angle and radius ($\phi2, r2$) in a second circumferential plane located at a distance d2 from the centerline of the tread, such that d1 differs from d2 in magnitude and/or sign (direction). Usually, but not necessarily, there is also at least one difference in value between (m1,$\phi1$,r1) and (m2,$\phi2$,r2).

The combined effect of the static imbalance and the couple imbalance is referred to as the dynamic imbalance of a tire, which is the total imbalance experienced by a rotating tire. As static imbalance and couple imbalance are two distinct and mutually independent physical phenomena, the dynamic behavior of a rotating tire can be analyzed by overlaying the effect of static imbalance on the effect of couple imbalance. Virtually all tires have some differences in the distribution of the tire mass that causes dynamic imbalance to be present, but the imbalance will be negligible, or at least acceptable, in a "uniform" tire. Of course, as detailed hereinabove, measurement of uniformity and therefore acceptability of a tire is a rotational speed dependent phenomenon because the forces produced by nonuniformities are speed dependent.

U.S. Pat. No. 5,396,438 (K. L. Oblizajek, assigned to General Motors Corporation, hereinafter referred to as the "GM Patent"), incorporated in its entirety by reference herein, discloses a method of manufacturing tires which preferably includes measurement of two or more low speed tire parameters, determination of transfer functions which are used to calculate predicted highway speed (high speed) force variations, and then comparison of high speed values predicted for production tires to predetermined criteria for controlling manufacture of the production tires responsive to the comparison. The determination of transfer functions comprises testing a sample set of tires at both low speed and high speed on tire uniformity machines. The GM Patent's primary embodiment is for prediction of high speed, fore-aft (tangential) force variations (TFV), but it is stated that the method can be advantageously applied to prediction of high speed LFV and RFV in the same manner. It is further stated that any harmonic ("order of tire rotation") of the high speed force variations can be predicted according to the disclosed method. The low speed measurements are made of two or more tire parameters selected from a list which includes: "variations in effective rolling radius, radial force variation, geometric runout variation, tread gauge variation of finished tire, variations in angles of internal tire reinforcing materials, that is, steel belts and fabric or steel body plies of the finished tire, variations in geometry, that is, widths and locations of edges and centerline of internal tire reinforcing materials such as steel belts and fabric or steel body plies of the finished tire, tread gauge variation of the tire at intermediate stages of manufacture, variations in angles of internal tire reinforcing materials, that is steel belts and fabric or steel body plies of the tire at intermediate stages of manufacture, variations in geometry, that is widths and locations of edges and the centerline of internal tire reinforcing materials such as steel belts and fabric or steel body plies at intermediate stages of manufacture and tire fore and aft force variation." (col. 15, line 63 et. seq.) In the claims, this list is generally narrowed to include "selecting first and second measurable parameters from a set comprising: variation in effective rolling radius; radial force variation; geometric runout variation; and fore and aft force variation." The primary embodiment of the GM invention discloses an equation (6) in col. 10 for a calculated prediction of the fore and aft force component Fxnm measured at the selected highway speed of tire 'm' at order (harmonic) 'n'. The equation (6) is a sum of low speed measurements 'F' multiplied by complex quantity transfer functions 'H' for a tire 'm' at order (harmonic) 'n'. Equation (6) uses the n,m components of three low speed measurements: Fznm is the radial force; Frnm is the effective rolling radius; and Funm is the geometric runout. An assumption that makes this equation usable is stated in col. 11, line 66 et. seq.: "If the quantities Hzn, Hrn, Hun, . . . are known, then Equation (6) can be used to predict Fxn. This has generally not been the case because the particular details and manner by which parameters such as tire mass, stiffness, and damping matrices or the equivalents, combine to effect the polynomials $p_q(s)$ are unknown. However, as recognized by this invention, for quantities of tires manufactured by an individual tire manufacturer to a given engineering specification, i.e., where all tires are intended to be identical, these parameters will be relatively invariant among these ostensibly identical tires. Variations between tires, furthermore, will only occur in the measurements of non-uniformity, i.e., Fzn, Frn, Fun, . . . ."

U.S. Pat. No. 6,065,331 (K. Fukasawa, assigned to Bridgestone Corporation, hereinafter referred to as the "Bridgestone Patent"), incorporated in its entirety by reference herein, discloses method and apparatus for predicting a higher-order component ($2^{nd}$ and higher harmonics) of high speed uniformity of a tire, and method of manufacturing tires utilizing the method and apparatus. The method preferably comprises measuring, for a single tire within a tire lot, a low-speed dynamic stiffness at a frequency corresponding to an order of a higher-order component to be predicted when said tire rolls at a low speed, and a high-speed dynamic stiffness at a frequency corresponding to said order when said tire rolls at a high speed, and then using the dynamic stiffness measurements in an equation to predict high speed RFV or TFV from low speed measurements of RFV and radial runout (effective rolling radius). The preferred method of determining low speed radial runout is to calculate it from low speed TFV measurements, according to a linear relationship with slope and intercept constants determined by a linear regression calculation performed on measurements of 20 tires within the tire lot. The tire vertical dynamic stiffness is obtained from vertical displacement of a tire axis, namely, vertical displacement X of a drum surface, and vertical axial force Fz of a tire, which are measured by using a protrusion run-over type testing machine including a drum having a cleat mounted on the surface of the drum. The highest tire speed measured on such a drum is reported as 85 Kph.

It is an object of the present invention to overcome perceived limitations in the methods of the GM Patent and of the Bridgestone Patent in order to improve the prediction of high speed tire uniformity for production tires using predictive calculations incorporating realistically achievable factory floor measurements of the production tires. Calculated prediction of all relevant harmonics of radial, lateral and tangential force variation for tire speeds in a wide range of high speeds is desired, with an accuracy (correlation) that is improved over the accuracy of the prior art methods.

BRIEF SUMMARY OF THE INVENTION

According to the invention, a method for predicting a harmonic component of force variation comprises the steps of: collecting a first set of measurement data for a tire sample on a factory floor balance checker and on a factory floor tire uniformity machine which is operated at a first speed; collecting a second set of measurement data for the tire sample on a test lab tire uniformity machine which is operated at a second speed higher than the first speed; determining transfer functions from the first set of measurement data and the second set of measurement data; collecting a third set of measurement data for a production tire on a factory floor balance checker and on a factory floor tire uniformity machine; and predicting the harmonic component of force variation for the production tire rotating at a prediction speed by applying the transfer functions to the third set of measurement data.

According to the invention, the method further comprises the step of selecting the second speed to be approximately equal to the prediction speed.

According to the invention, the method further comprises the steps of selecting the tire sample as a sample set of one or more tires selected from tire production after tire assembly; and preferably selecting the tire sample as a sample set of one or more tires of the same construction which is substantially the same as the construction of the production tire for which prediction is desired.

According to the invention, the method further comprises the step of collecting the first set of measurement data on a factory floor balance checker which determines single plane balance in terms of single plane net imbalance mass and rotational angular location of the net imbalance mass. Alternatively, the method further comprises the step of collecting the first set of measurement data on a factory floor balance checker which determines two plane balance in terms of a net imbalance mass and rotational angular location of the net imbalance mass for each of two circumferential planes of the tire being balance checked.

According to the invention, the method further comprises the step of providing a tire zero-degree reference mark on each sample tire and on each production tire for maintaining consistent rotational angular references in the measurement data collected from the tire uniformity machines and the balance checker.

According to the invention, the method further comprises the step of collecting the third set of measurement data for the production tire on the same factory floor balance checker and on the same factory floor tire uniformity machine as were used for collecting the first set of measurement data for the tire sample; and collecting the third set of measurement data while operating the factory floor tire uniformity machine at the first speed.

According to another embodiment of the invention, a method of manufacturing tires comprises the steps of: collecting a first set of measurement data for a tire sample on a factory floor balance checker and on a factory floor tire uniformity machine which is operated at a first speed; collecting a second set of measurement data for the tire sample on a test lab tire uniformity machine which is operated at a second speed higher than the first speed; determining transfer functions from the first set of measurement data and the second set of measurement data; collecting a third set of measurement data for a production tire on factory floor balance checker and on a factory floor tire uniformity machine; predicting a harmonic component of force variation for the production tire rotating at a prediction speed by applying the transfer functions to the third set of measurement data; comparing the predicted harmonic component of force variation for the production tire to predetermined criteria; and controlling the manufacturing of production tires in response to the comparison.

According to the invention, the manufacturing method further comprises the step of selecting the second speed to be approximately equal to the prediction speed.

According to the invention, the manufacturing method further comprises the step of selecting the tire sample as a sample set of one or more tires selected from tire production after tire assembly; and preferably selecting the tire sample as a sample set of one or more tires of the same construction which is substantially the same as the construction of the production tire for which prediction is desired.

According to the invention, the manufacturing method further comprises the step of collecting the third set of measurement data for the production tire on the same factory floor balance checker and on the same factory floor tire uniformity machine as were used for collecting the first set of measurement data for the tire sample; and collecting the third set of measurement data while operating the factory floor tire uniformity machine at the first speed.

According to another embodiment of the invention, an apparatus for controlling tire manufacturing, comprises: factory floor testing equipment comprising a low speed tire uniformity machine and a balance checker for measuring tires after tire assembly; test lab testing equipment comprising a high speed tire uniformity machine; a computer for collecting measurement data from the factory floor testing equipment and from the test lab testing equipment, for determining transfer functions and for predicting a harmonic component of force variation; and a quality control device for accepting and rejecting production tires based on a harmonic component of force variation predicted for the production tires.

According to the invention, the apparatus is further characterized in that the quality control device provides feedback for correcting the tire assembly process.

According to the invention, the apparatus is further characterized in that the factory floor balance checker is selected from devices capable of measuring single plane balance and devices capable of measuring two plane balance.

According to the invention, the apparatus is further characterized in that the factory floor testing equipment and the test lab testing equipment are able to determine rotational angular position with reference to a zero-degree reference mark on a tire being tested.

Other features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199a, 199b, 199c, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein.

DETAILED DESCRIPTION OF THE INVENTION

As detailed in the background section hereinabove, radial, lateral and tangential force variations are important measurements that indicate tire uniformity in general, and in particular indicate vibrational aspects of a tire's performance on a moving vehicle. Since tire force variations change with the tire's speed of rotation, it is important to know how a tire will perform at higher speeds such as highway speeds (e.g., 100 Kph or more). Unfortunately, high speed tire uniformity measurements are not generally practical on the factory floor as part of normal tire manufacturing, so various methods of predicting high speed performance from low speed factory floor measurements have been developed. Since it is the easiest force variation to measure at low speeds, radial force variation (RFV) at the low speed of typically 60 rpm is commonly measured during tire production, and for many years has been used as a predictor for the high speed RFV based on an assumed linear relationship. Tangential force variation (TFV) is relatively small in magnitude at 60 rpm and therefore the most difficult to measure in production, so for many years TFV was only measured on limited samples of production tires using laboratory high speed TUMs. Prediction of high speed tire uniformity has therefore been limited in capability, and the accuracy of prediction has deteriorated as the industry definition of "high speed" has increased to even higher speeds.

The methodologies disclosed in the GM Patent and the Bridgestone Patent have been developed to predict high speed tire uniformity, especially various harmonics of the high speed TFV. The GM Patent's predictions are primarily based on low speed RFV and angular velocity variation data with the possible addition of geometric (runout) variation data. The Bridgestone Patent's predictions are based on low speed force variation data, low speed radial runout data, and dynamic stiffness measurements. Although there are generally three sources of nonuniformity in a tire (geometrical, stiffness and mass asymmetries), the prior art methodologies including those of both the GM Patent and the Bridgestone Patent, generally do not directly account for the effect of mass asymmetries on tire uniformity measurements at different tire speeds. The three asymmetries interact at the tire's footprint and produce RFV, LFV and TFV at the footprint, which are transferred to the spindle of a TUM (or axle of a vehicle) through the tire structure. Both force creation and force transmission are speed dependent. For example, mass related forces are negligible or practically unmeasurable at 60 rpm, but play an increasingly higher role as the speed increases, making prediction based only on low speed force measurement data insufficient.

A primary conception of the present invention concerns recognizing the importance of mass asymmetries and then determining a way to include realistically achievable factory floor measurements of production tire mass asymmetries in transfer functions used to predict high speed tire uniformity from factory floor measurements. The inventive method makes use of tire balance data (corrective weight and its angular location) as a practical measurement of the mass asymmetry. Tire balance checking machines are commonly used in tire production, and can be easily operated at rotational speeds much higher (e.g., 500 rpm) than the typical 60 rpm of a low speed, factory floor TUM. The higher speeds are known to improve the quality of the balance check, and will therefore improve the accuracy of the inventive prediction method, although even a low speed balance check, or even a "bubble balance" determination of static imbalance may be sufficient for the inventive method. References herein to balance checking machines are intended to include any device capable of determining the net imbalance of a tire in terms of the magnitude and location of the net imbalance. Where appropriate, the balance referred to may be single-plane imbalance or may be two-plane imbalance. For example, although the use of single-plane balance measurement data should be adequate to produce improved predictions of high speed tire uniformity, the use of two-plane balance measurement data should produce even more improvement in predictions of high speed tire uniformity, particularly in the case of predicted lateral force variations. Balance checking machines are known by many terms, and all such devices are within the scope of the present invention, including those termed, for example, balance tester, imbalance tester, tire balancer, spin-balance machine, bubble balance tester, etc.

The application of the inventive concept to the prediction of tangential force variation (TFV) will be presented as an embodiment of the invention. The same general techniques can be applied to the prediction of radial force variation (RFV) and of lateral force variation (LFV) in ways that should become apparent to one skilled in the relevant arts in light of the concepts and methods presented herein.

Figure 1:
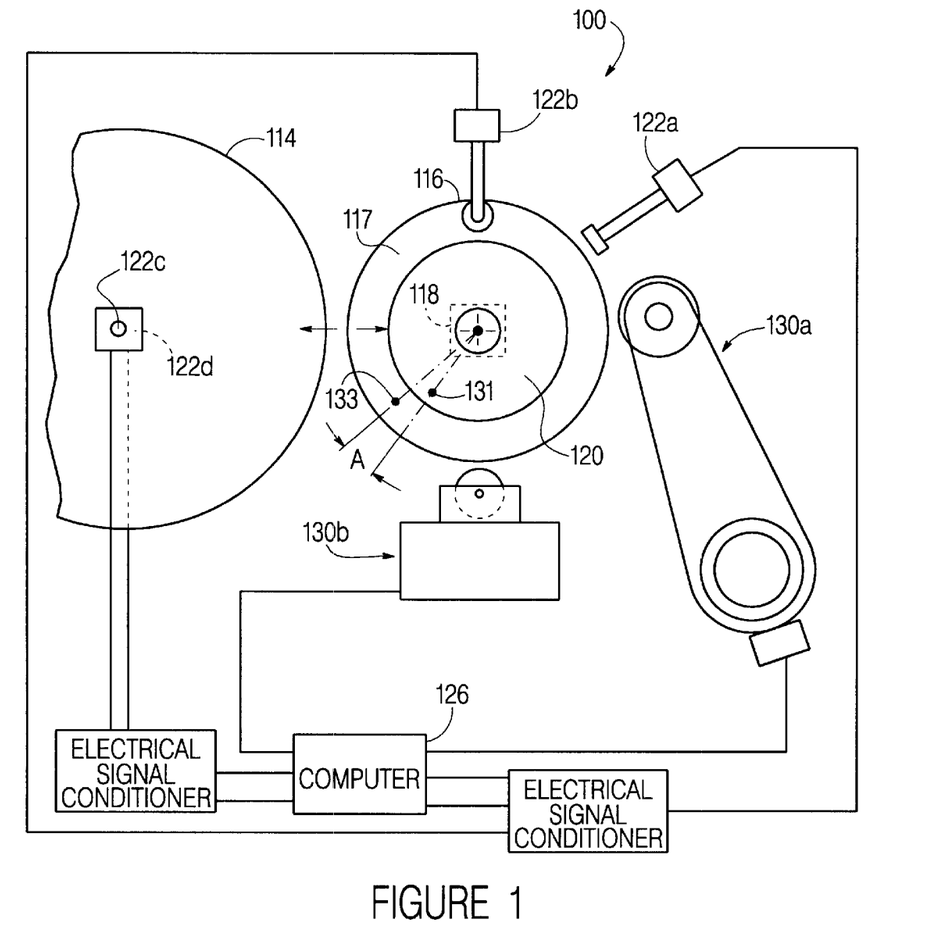
FIG. 1 is a representative view of a tire uniformity machine with a tire mounted thereon, according to the present invention.

FIG. 1 shows a schematic of a tire uniformity machine (TUM) 100, illustrating an example of a typical tire uniformity machine such as would be suitable for the present invention. A load wheel 114 applies a load to a tire 116 mounted on a rim 120 that is rotated by a drive motor 118. One or more sensors 122 (122a, 122b, 122c, 122d) measure, as needed: lateral, tangential, and radial forces exerted by the tire 116. Lateral forces occur perpendicular to the plane in which the tire 116 rotates. Tangential forces act tangentially to the tire's circumference. Radial forces act parallel to a radius of the tire 116. Sensors 122 may also be provided to measure geometric characteristics such as radial and/or lateral position of portions of the tire 116 (e.g., tread, shoulder), to measure position of the axis of rotation of the tire, and to measure rotational angle of the rim and/or of the tire. A zero-degree reference mark readable by a sensor is generally provided on the rim (rim zero-degree reference mark 131). A tire zero-degree reference mark 133 readable by a sensor can be provided on the tire, for example by means of a reflective sticker applied to the tire sidewall. The angle between the rim zero-degree reference mark 131 and the tire zero-degree reference mark 133 is angle A. Measurements are made electronically by the tire uniformity machine 100 using the sensors 122, and then converted to force and geometric measurements as appropriate. Measurement signals are then preferably transferred to a computer 126 for analysis and possible storage. Optional grinders 130 (130a, 130b) can be incorporated in the tire uniformity machine 100 in order to correct the tire 116 uniformity, thereby improving its quality, by grinding as determined by the computer 126 which utilizes the uniformity force measurements in combination with predetermined criteria and other test data, possibly communicated by means of a connection to a factory computer network (not shown).

Figure 2:
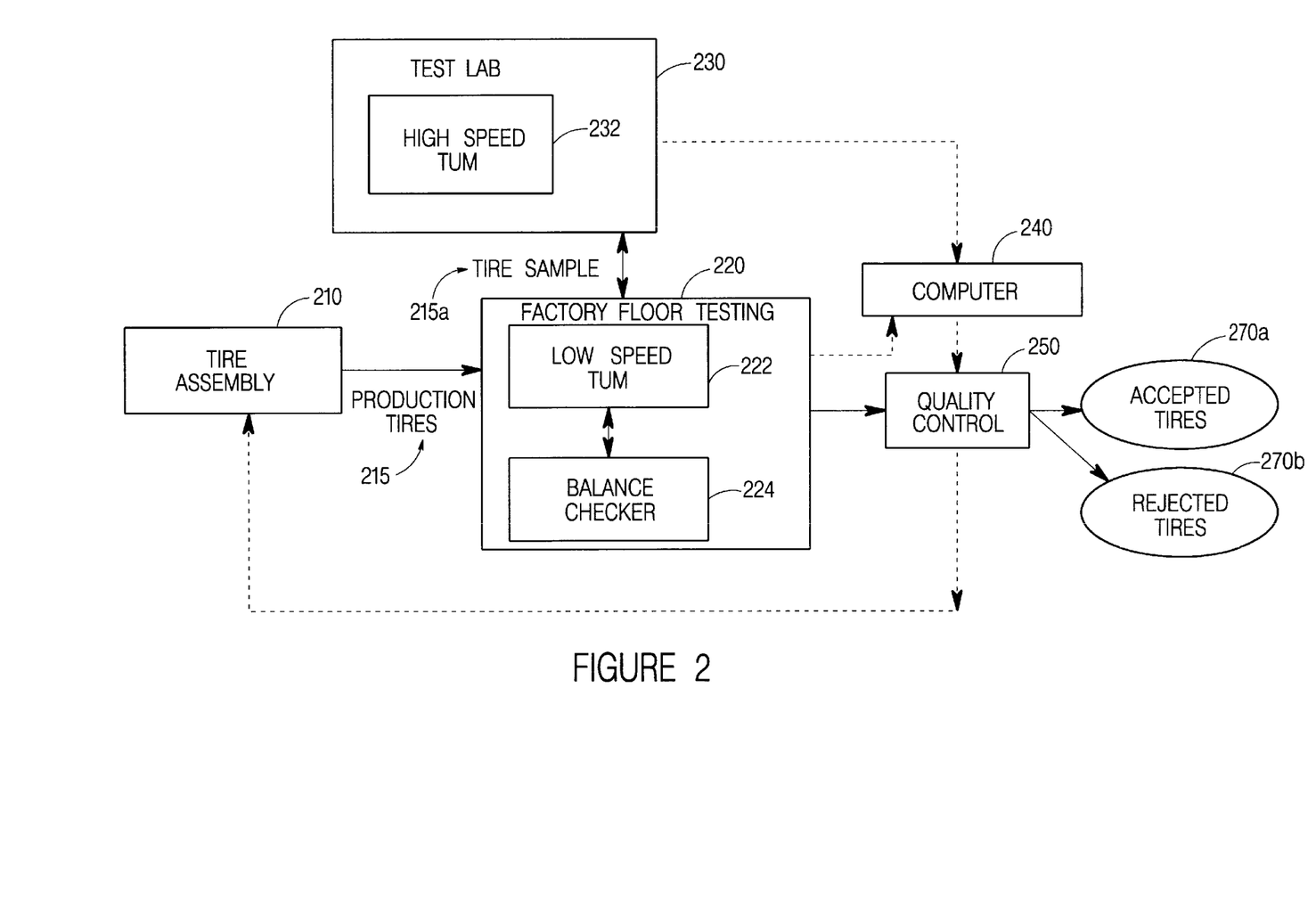
FIG. 2 is a block diagram of equipment for a method of manufacturing tires, according to the present invention.

FIG. 2 illustrates an overall arrangement of equipment suitable for an implementation of the present invention. It should be noted that although all of the illustrated equipment is currently available within the art of tire manufacturing and quality control, the present invention lies in a particular combination of equipment and in the inventive method of utilizing the particular combination of equipment for gathering specific data and for performing specific calculations required for the improved quality control according to the present invention. Referring to FIG. 2, the tire manufacturing process of the present invention comprises the illustrated arrangement of equipment. After tire assembly 210 (including tire building and curing), production tires 215 are subjected to factory floor testing 220 before being sorted by a quality control process 250 which separates accepted tires 270a from rejected tires 270b. The rejected tires 270b may be scrapped or re-worked as determined by standard tire production methods. In addition to sorting tires, the quality control process 250 optionally also provides feedback to the tire assembly process 210 in order to make corrections (e.g., manufacturing machine adjustments) based on the results observed by the quality control process 250. There may be more than one type of "accepted" tire 270a if, for example, there are different acceptance criteria for different customers. The quality control process 250 is preferably an automated quality control device under control of a computer 240 which may be a networked computer. The computer 240 receives measurement data from the factory floor testing 220 and also utilizes data obtained from a test lab 230. The factory floor testing 220 conducts measurements (to be detailed hereinbelow) on a low speed TUM 222 (e.g., TUM 100) and on a balance checker 224. In parallel with production, although preferably conducted at a previous time, a tire sample 215a is taken of the production tires 215, preferably a small number (e.g., 20 to 30 or as required for statistical significance) of sample tires 215a having the same construction as the production tires 215, is tested in both the test lab 230 and in the factory floor testing 220. In the test lab 230, the one or more tires in the tire sample 215a is tested on a high speed TUM 232 (e.g., TUM 100, but generally without the optional grinders 130).

Figure 3:
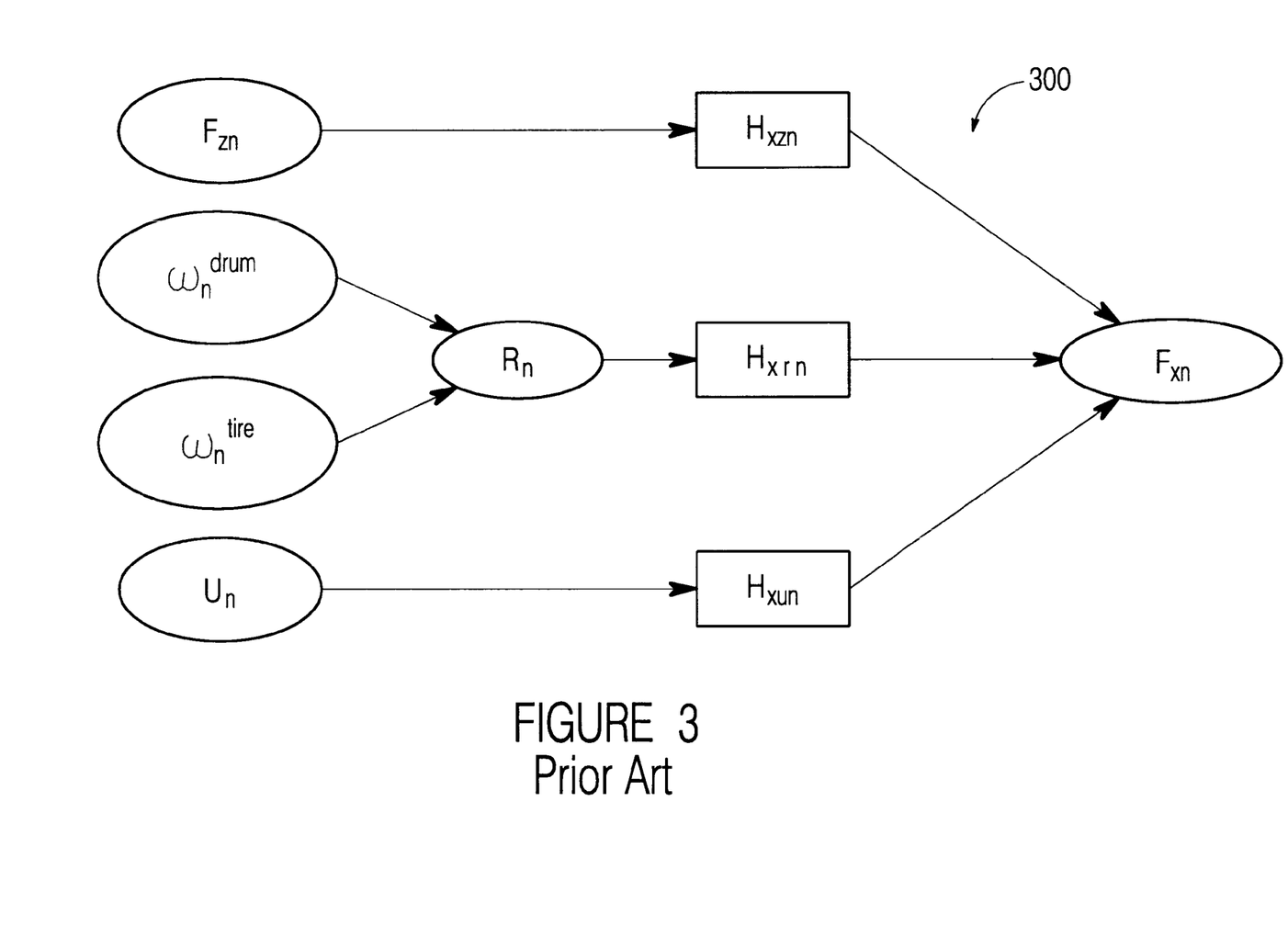
FIG. 3 is a block diagram for a calculation of a predicted tangential force variation component at a second speed from measurements made at a first speed, according to the prior art.

The prior art, in particular the art disclosed in the GM Patent, uses an approach summarized by the block diagram 300 in FIG. 3 for calculating a predicted TFV component at a second speed (generally a high speed) from measurements made at a first speed (termed in the GM Patent as a "low speed"). The block diagram 300 uses arrows to indicate the flow of calculations starting with variables measurements in the ovals on the left and using transfer functions in the boxes to determine the predicted value on the right. The equation form of this calculation is as follows (this is a version of equation (6) from the GM Patent, using slightly different notation adapted for use herein):

$$F_{xn} = H_{xzn} \cdot F_{zn} + H_{xrn} \cdot R_n + H_{xun} \cdot U_n \quad (1) \text{ (prior art)}$$

where $F_{xn}$ is a complex n-th harmonic of the tangential (fore-aft) force predicted for a given high speed for a single tire (the tire 'm' of the GM patent), $F_{zn}$ is a complex n-th harmonic of the radial force measured at a low speed for the single tire, $R_n$ is a complex n-th harmonic of the tire's instantaneous radius (effective rolling radius) measured at the low speed for the single tire, $U_n$ is a complex n-th harmonic of the tire's runout measured at the low speed for the single tire, $H_{xzn}$ is a complex transfer function between the n-th harmonic of the high speed tangential force and the n-th harmonic of the low speed radial force, $H_{xrn}$ is a complex transfer function between the n-th harmonic of the high speed tangential force and the n-th harmonic of the low speed instantaneous radius, and $H_{xun}$ is a complex transfer function between the n-th harmonic of the high speed tangential force and the n-th harmonic of the low speed runout.

The instantaneous radius R is calculated as follows:

$$R = R_{drum} \frac{\overline{\omega}_{drum}}{\overline{\omega}_{tire}} \left( 1 + \frac{\tilde{\omega}_{drum}}{\overline{\omega}_{drum}} - \frac{\tilde{\omega}_{tire}}{\overline{\omega}_{tire}} \right) \text{ (prior art) where} \quad (2)$$

$R_{drum}$ is the radius of the drum of the uniformity machine, $\overline{\omega}_{drum}$ is the average angular velocity of the drum, $\overline{\omega}_{tire}$ is the average angular velocity of the tire, $\tilde{\omega}_{drum}$ is the variation of the angular velocity of the drum, and $\tilde{\omega}_{tire}$ is the variation of the angular velocity of the tire.

It should be understood that "complex" values are values that are characterized by a combination of more than one numeric value, and in this context refer to a combination of magnitude and angle, or so-called real (in-phase) and imaginary (90 deg, or out of phase) components. For example, $F_{zn}$ is a combination of the magnitude of radial force and the rotational angle at which the radial force is measured. Furthermore, "n-th harmonic" is to be understood in the conventional, well-known in the art, sense of referring to Fourier transform components for the n-th term of a Fourier transform.

For the GM Patent calculations, the above transfer functions are assumed to be invariable for a given harmonic, tire construction and size, and a given combination of the low speed and high speed. (The low speed is typically 60 RPM of a standard production TUM).

In the development of the present invention, it was determined that there is typically enough commonality in the radial force variation $F_{zn}$ and runout $U_n$ to make the runout term $H_{xun} \cdot U_n$ redundant in the prediction equation. At the same time, it was noted that prediction quality (accuracy) for equation (1) was increasingly poor as the prediction speed was increased. It was deduced that some components of a tire's non-uniformity are substantially changing with the speed. One such component is the force variation due to mass asymmetry, which produces forces at the footprint proportional to the square of the tire's angular velocity. To take mass asymmetry into account, the present invention includes tire imbalance as a vector or complex value (comprised of the needed corrective mass and its angular position on the wheel) as an input into a new prediction equation, suitable for prediction of any harmonic, including the first harmonic. The same vector or complex value for balance is used in all harmonic equations, so that the balance value is represented by "B" in the equations, without any subscript reference to n-th harmonics. In the embodiment disclosed hereinbelow, equations for prediction of tangential force variation (TFV) using single plane balance will be presented as an example. This is not intended to limit the invention, which could also use two-plane balance for the complex "balance" value $^B$, and could be applied to any type of force variation.

Figure 4:
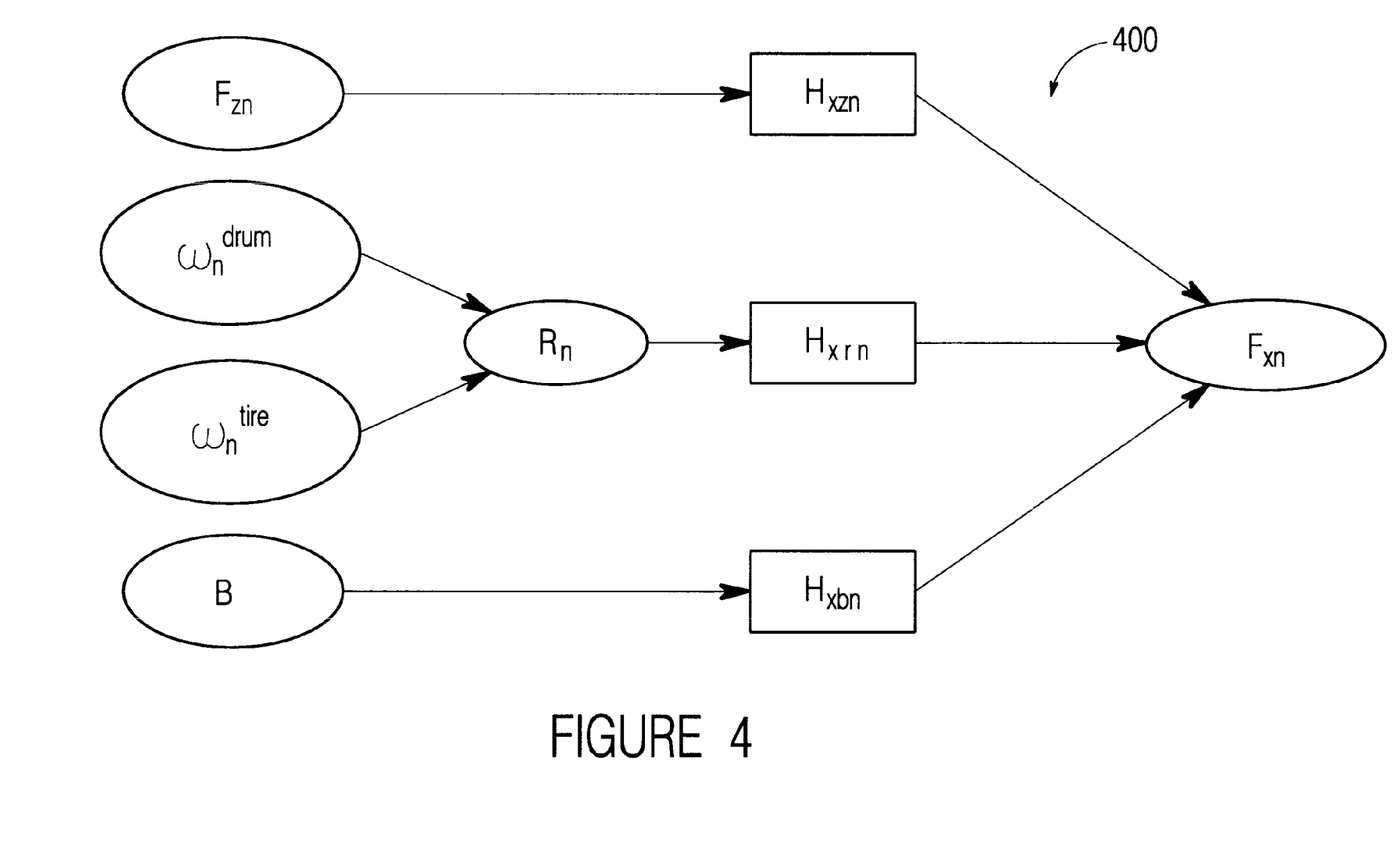
FIG. 4 is a block diagram for a calculation of a predicted tangential force variation component at a second speed from measurements made at a first speed, according to the present invention.

The present invention's new prediction equation is summarized by the block diagram 400 in FIG. 4 for calculating a predicted TFV at a second speed (generally a high speed) from measurements made in the factory floor testing 220. The block diagram 400 uses arrows to indicate the flow of calculations starting with variables measurements in the ovals on the left and using transfer functions in the boxes to determine the predicted value on the right. The equation form of this calculation is as follows:

$$F_{xn} = H_{xzn} \cdot F_{znf} + H_{xrn} \cdot R_n + H_{xbn} \cdot B \qquad (3)$$

where $F_{xn}$ is a complex n-th harmonic of the tangential force predicted for a given second speed (generally a high speed) for a single tire, $F_{zn}$ is a complex n-th harmonic of the radial force measured at a first speed (generally a low speed as on a factory floor TUM 222) for the single tire, $R_n$ is a complex n-th harmonic of the tire's instantaneous radius measured at the first speed (e.g., on the factory floor TUM 222) for the single tire, wherein the instantaneous radius is determined by known means, calculating, for example, using equation (2) shown hereinabove, B is a complex value for tire balance, represented by corrective mass and its angular position, e.g., measured on the factory floor balance checker 224 for the single tire, $H_{xzn}$ is a complex transfer function between the n-th harmonic of the second speed tangential force and the n-th harmonic of the first speed radial force, $H_{xrn}$ is a complex transfer function between the n-th harmonic of the second speed tangential force and the n-th harmonic of the first speed instantaneous radius, and $H_{xbn}$ is a complex transfer function between the n-th harmonic of the second speed tangential force and the tire balance.

Referring again to FIG. 2, in order to determine the transfer functions, a tire sample 215a must be tested in both factory floor testing 220 (nominally a "low speed test") and in the test lab 230 (nominally a "high speed test"), thereby creating two sets of measurement data which are processed in a computer (e.g., computer 240) using calculations such as those detailed hereinbelow. Although the prediction equation will work using transfer functions determined from any tire sample 215a which has a tire construction similar to that of the production tires 215 and which is measured at any two speeds on any devices capable of measuring the required variables, the best accuracy (prediction quality) will be obtained from the use of a tire sample 215a which has the same tire construction (including size) as the production tires 215 and which is measured preferably on the same low speed TUM 222 and preferably on the same balance checker 224 as the production tires 215. Furthermore, it is preferable that the speed of the high speed TUM 232 when the test lab 230 measurements are made matches the speed for which predictions are desired. Also, as noted elsewhere herein, it is preferable to use the most accurate balance checker 224 that is practical for use in factory floor testing 220 of production tires. This generally means using a higher speed balance checker (e.g., 300 RPM or higher) even though the factory floor testing 220 measurements are generically referred to as "low speed" measurements because of the practical restrictions on the speed of the factory floor TUM units (which generally operate at 60 RPM).

It should be noted that in order to calculate transfer functions for a given tire, measurements that are related to rotational angular position on the given tire must be made on different machines (e.g., low speed TUM 222, balance checker 224, and high speed TUM 232). In order to maintain consistent angular references among the multiple machine measurements, it is preferable to have a tire zero-degree reference mark 133 which is either readable by sensors on the various measuring machines, or else the mark 133 can be aligned with a rim zero-degree reference mark 131 when mounting the tire on a machine. This alignment produces an angle A between marks 131 and 133 that must be known and is preferably substantially equal to zero degrees.

After testing the tire sample 215a, the transfer functions are found using known mathematical procedures as detailed in the prior art, but applied to the variables particular to the present invention. An example of the calculations for determining the transfer functions $H_{xzn}$, $H_{xrn}$, $H_{xbn}$ used in the prediction equation (3) for tangential force $F_{xn}$ is as follows:

First, multiply the equation (3) by complex conjugates of each of the three input harmonics for a given tire m, obtaining a system (4) of the three equations as follows:

$$F_{xnm} \cdot F^*_{znm} = H_{xzn} \cdot F_{znm}$$

$$\cdot F^*_{znm} + H_{xrn} \cdot R_{nm} \cdot F^*_{znm}$$

$$+ H_{xbn} \cdot B_m \cdot F^*_{znm}$$

$$F_{xnm} \cdot R^*_{nm} = H_{xzn} \cdot F_{znm}$$

$\cdot R^*_{nm} + H_{xrn} \cdot R_{nm} \cdot R^*_{nm}$ $+ H_{xbn} \cdot B_m \cdot R^*_{nm}$ $F_{xnm} \cdot B^*_m = H_{xzn} \cdot F_{znm} \cdot B^*_m$ $+ H_{xrn} \cdot R_{nm} \cdot B^*_m + H_{xbn}$ $\cdot B_m \cdot B^*_m \quad \quad (4)$ Taking summation for all (total number M) of the tested tires m and averaging across the tires we obtain:

$C_{xzn} = H_{xzn} \cdot C_{zzn} + H_{xrn}$ $\cdot C_{rzn} + H_{xbn} \cdot C_{bzn}$ $C_{xrn} = H_{xzn} \cdot C_{zrn} + H_{xrn} \cdot C_{rrn}$ $+ H_{xbn} \cdot C_{brn}$ $C_{xbn} = H_{xzn} \cdot C_{zbn} + H_{xrn} \cdot C_{rbn}$ $+ H_{xbn} \cdot C_{bb} \quad \quad (5)$ where the cross-spectra functions for the n-th harmonic of the channels i and j are calculated as follows:

$$C_{ijn} = \frac{\sum_{m=1}^{M} F_{in} \cdot F^*_{jn}}{M} \quad (6)$$

where * represents a complex conjugate, m is a current tire number,

M is the total number of tires, and $F_{in}$ or $F_{jn}$ are n-th harmonics of the measured signals.

Equations (5) can be presented in the matrix format as follows:

$$\begin{Bmatrix} C_{xz} \\ C_{xr} \\ C_{xb} \end{Bmatrix}_n = \begin{bmatrix} C_{zz} & C_{rz} & C_{bz} \\ C_{zr} & C_{rr} & C_{br} \\ C_{zb} & C_{rb} & C_{bb} \end{bmatrix}_n \begin{Bmatrix} H_{xz} \\ H_{xr} \\ H_{xb} \end{Bmatrix}_n \quad (7)$$

Solving with respect to the transfer functions provides the following final matrix equation for finding the transfer functions:

$$\begin{Bmatrix} H_{xz} \\ H_{xr} \\ H_{xb} \end{Bmatrix}_n = \begin{bmatrix} C_{zz} & C_{rz} & C_{bz} \\ C_{zr} & C_{rr} & C_{br} \\ C_{zb} & C_{rb} & C_{bb} \end{bmatrix}_n^{-1} \begin{Bmatrix} C_{xz} \\ C_{xr} \\ C_{xu} \end{Bmatrix}_n \quad (8)$$

where "−1" denotes the inverse matrix.

In the calculations hereinabove, an embodiment of the invention is detailed for predicting any harmonic component of tangential force variation at a second speed (generally a "high" speed) for a production tire measured using production (factory floor) measuring devices operated at factory floor test speeds (nominally a first, "low" speed). Once the transfer functions have been determined from measurements on a tire sample 215a, the equation (3) can be used to predict a high speed tangential force variation harmonic component. It should be noted that references herein to "high speed" and "low speed" are exemplary of the most common usage, but are not intended to limit the scope of the invention wherein the inventive method could be applied to predict a harmonic component of force variation at any second speed based upon measurements obtained at any first speed. Adding superscripts to emphasize the type of measurement involved ("high" speed or "low" speed), equation (3) can be re-written as:

$$F_{xn}^{high} = H_{xzn} \cdot F_{zn}^{low} + H_{xrn} \cdot R_n + H_{xbn} \cdot B \quad (9)$$

Analogous prediction equations, also embodying the inventive concept of incorporating a tire balance term, can be determined for harmonic components of radial force variation $F_{zn}$ and of lateral force variation $F_{yn}$. For example, to predict radial force variation, the prior art typically uses the following equation which utilizes the GM Patent method but typically without the runout term and the instantaneous radius term:

$$F_{zn}^{high} = H_{zzn} \cdot F_{zn}^{low} \quad (10) \text{ (prior art)}$$

The present invention adds a balance term to the prior art equation:

$$F_{zn}^{high} = H_{zzn} \cdot F_{zn}^{low} + H_{zbn} \cdot B \quad (11)$$

where $F_{zn}^{high}$ is a complex n-th harmonic of the radial force predicted for a given high speed (second speed) for a single tire, $F_{zn}^{low}$ is a complex n-th harmonic of the radial force measured at a low speed (first speed, generally measured on the factory floor TUM 222) for the single tire, B is a complex value for tire balance, represented by corrective mass and its angular position, e.g., measured on the factory floor balance checker 224 for the single tire, $H_{zn}$ is a complex transfer function between the n-th harmonic of the high (second) speed radial force and the n-th harmonic of the low (first) speed radial force, and $H_{zbn}$ is a complex transfer function between the n-th harmonic of the high speed radial force and the tire balance.

The equations (9), and (11) are merely examples of prediction equations according to the present invention, and they are not intended to limit the scope of the invention which primarily concerns the inclusion of a balance term $H_{\_bn} \cdot B$ in the prediction equation (with the underscore symbol, "_", indicating the appropriate subscript in the transfer function component: x for tangential, z for radial, and y for lateral). The complex value for tire balance B is preferably a single-plane balance, but it is within the scope of the invention to utilize a two-plane balance measurement also. As noted in the prior art, the other terms in the prediction equations, e.g., equations (9) and (11), can be selected from a variety of TUM measurements. For example, in the exemplary equation (9) for RFV prediction, an instantaneous radius term $H_{xrn} \cdot R_n$ is suitably omitted because it is mainly relevant to TFV, but such a term could be included in the prediction equation (9) according to the invention.

Tests have been conducted which show an improved quality of prediction obtained by using the inventive method according to equations (9) and (11). The first table below shows percent error for the predicted $F_{x1}^{high}$ (first harmonic component of the predicted TFV) versus the actual $F_{x1}$ measured on a test lab TUM 232 for the same tire at the same speed. In the third column, predicted $F_{x1}^{high}$ values are listed which were calculated from measurements of $F_{z1}^{low}$, $R_1$ according to common practice of the prior art such as the GM Patent, i.e., using prior art equation (1) except that the radial runout term $H_{xun} \cdot U_n$ was omitted as negligible. In the fifth column, predicted $F_{x1}^{high}$ values are listed which were calculated from measurements of $F_{z1}^{low}$, $R_1$, and B according to the inventive method equation (9).

| Speed (Kph) | Lab Measured $F_{x1}^{high}$ | Predicted using measured $F_{z1}^{low}$, $R_1$ $F_{x1}^{high}$ | Error | Predicted using measured $F_{z1}^{low}$, $R_1$B $F_{x1}^{high}$ | Error |
|---|---|---|---|---|---|
| 40 | 2.1 | 1.03 | 51.0% | 1.12 | 46.6% |
| 60 | 4.6 | 3.05 | 33.7% | 3.19 | 30.6% |
| 80 | 8.8 | 6.39 | 27.3% | 6.59 | 25.1% |
| 100 | 14.8 | 12.17 | 17.8% | 12.60 | 14.9% |
| 120 | 24.3 | 20.86 | 14.2% | 21.89 | 9.9% |
| 140 | 40.0 | 33.18 | 17.1% | 35.48 | 11.3% |

The next table below shows correlation coefficients for the predicted $F_{z1}^{high}$ (first harmonic component of the RFV) for a group of test tires correlated with the actual $F_{z1}$ measured on a test lab TUM 232 for the same group of test tires at the same speed. The third and fourth columns list correlation coefficients for tests conducted in the CW (clockwise) direction, and the fifth and sixth columns list correlation coefficients for tests conducted in the CCW (counterclockwise) direction. In the third and fifth columns, correlation coefficients are listed for predictions which were calculated from measurements of $F_{z1}^{low}$ according to common practice of the prior art such as the GM Patent, i.e., using prior art equation (10). Comparing favorably with the prior art predictions, correlation coefficients are listed in the fourth and sixth columns for predictions which were calculated from measurements of $F_{z1}^{low}$ and B according to the inventive method equation (11).

| Speed | | Predicted $F_{z1}^{high}$ Correlation Coefficient | | | |
|---|---|---|---|---|---|
| | | CW direction Predicted using measured: | | CCW direction Predicted using measured: | |
| Kph | RPM | $F_{z1}^{low}$ | $F_{z1}^{low}$, B | $F_{z1}^{low}$ | $F_{z1}^{low}$, B |
| 40 | 320 | 0.97 | 0.99 | 0.98 | 0.99 |
| 60 | 478 | 0.92 | 0.97 | 0.93 | 0.97 |
| 80 | 635 | 0.83 | 0.94 | 0.85 | 0.95 |
| 100 | 793 | 0.73 | 0.92 | 0.76 | 0.93 |
| 120 | 951 | 0.62 | 0.88 | 0.65 | 0.90 |
| 140 | 1108 | 0.54 | 0.85 | 0.55 | 0.86 |

Figure 5:
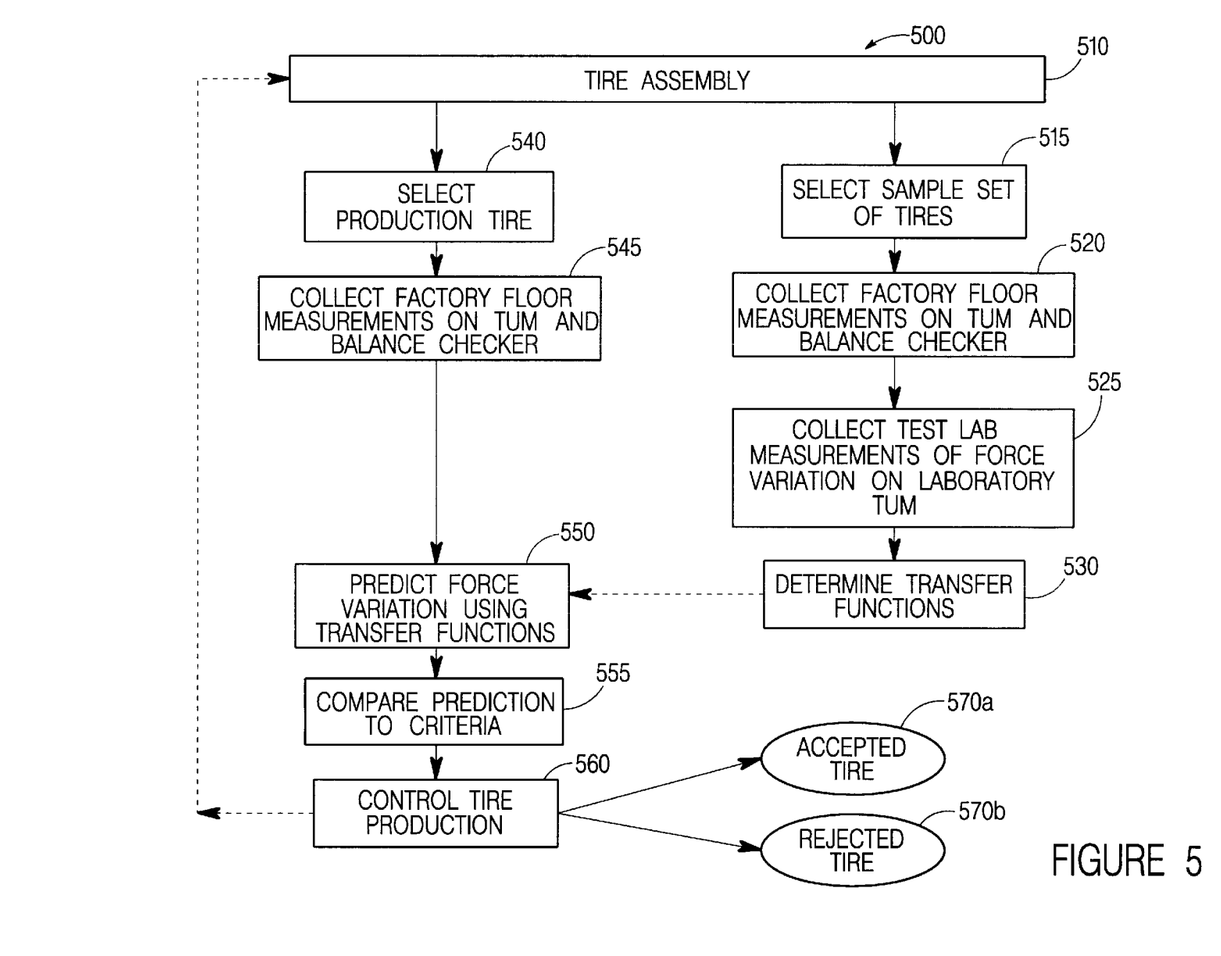
FIG. 5 is a flow diagram illustrating a tire manufacturing method, according to the present invention.

FIG. 5 is a flow diagram illustrating a tire manufacturing method 500 according to an embodiment of the present invention. The tire manufacturing method 500 incorporates the inventive method for predicting a harmonic component of force variation as described hereinabove, and in particular, a prediction method that utilizes factory floor measurements of tire balance. Equipment for the tire manufacturing method 500 is illustrated in the block diagram of FIG. 2. As shown in FIG. 5, and with reference also to FIG. 2, the tire manufacturing method 500 begins (step 510) with suitable tire assembly 210 by known tire production methods. In step 515, a sample set (tire sample 215a) of tires is selected from the overall production. The sample set 215a is preferably representative of a specific tire construction (e.g., type, size, design, etc.), and can number in quantity from 1 tire to preferably 20 or more tires as detailed hereinabove.

In step 520, suitable measurements are performed on the selected sample tires 215a, and the measurement data collected, in the factory floor testing 220. Suitable measurements must comprise at least a tire balance check on a balance checker 224, plus one or more measurements of tire uniformity on a factory floor TUM 222 (nominally a "low speed" TUM). The type of measurements made in the factory floor testing 222 generally depend on the nature of the prediction quantities desired for use as quality control criteria. For example, if the first harmonic of tangential force variation at a speed of 140 Kph is to be predicted for comparison to a predetermined quality criterion, and if equation (9) is to be used for the prediction calculation, then the first harmonic of radial force variation and the first harmonic of instantaneous radius are measured on the low speed TUM 222, and the tire balance is measured on the balance checker 224.

In step 525, suitable measurements are performed, and the measurement data collected, in the test lab 230, preferably on a high speed TUM 232. Suitable measurements made in the test lab 230 generally depend on the nature of the prediction quantities desired for use as quality control criteria. For example, if the first harmonic of tangential force variation at a speed of 140 Kph is to be predicted for comparison to a predetermined quality criterion, and if equation (9) is to be used for the prediction calculation, then the first harmonic of tangential force variation is measured, preferably at a speed of 140 Kph.

The measurement data from factory floor testing 220 and from the test lab 230 is preferably collected in a computer (e.g., 240). In step 530, the computer 240 determines transfer functions using the measurements from steps 520 and 525 in calculations such as in equations (4) through (8) hereinabove. For example, if the first harmonic of tangential force variation at a speed of 140 Kph is to be predicted for comparison to a predetermined quality criterion, and if equation (9) is to be used for the prediction calculation, then the three appropriate transfer functions to be calculated are $H_{xz1}$, $H_{xr1}$, and $H_{xb1}$. The calculated transfer functions are preferably stored in computer memory along with an indication of their suitable use, and the transfer functions and usage indications are made available for use in quality control (e.g., device 250).

The steps 515, 520, 525, and 530 are optionally performed on a tire sample set 215a only once for each specific tire construction, or are optionally performed at suitable times such as, for example, when any of the following events occur: start of a new production run, introduction of a new prediction speed required for quality control criteria, changes in the factory floor testing 220 equipment, periodic checking of the calculated transfer functions, etc.

The steps 540, 545, 550, 555, and 560 are routinely performed as a part of tire production according to the inventive method of manufacturing 500. In step 540 a production tire 215 is selected from tire assembly step 510 according to selection criteria wherein the production tire 215 suitably corresponds to the set of tires selected for the tire sample 215a in step 515.

In step 545, suitable measurements are performed on the selected production tire 215, and the measurement data collected, in the factory floor testing 220. Suitable measurements are preferably the same measurements which were performed on the corresponding set of tires selected for the tire sample 215a using a factory floor testing 220 low speed TUM 222 and a factory floor testing 220 balance checker 224. For better prediction quality, the same specific factory floor testing 220 machines 222, 224 should be used on the production tire 215 as were used on the tire sample 215a tires, or at least machines 222, 224 which are as equivalent as possible to those used on the tire sample 215a tires.

In step 550, the desired force variation component (e.g., the first harmonic of tangential force variation at a speed of 140 Kph) is predicted by applying a suitable prediction equation (e.g., equation (9)) to the measurement results collected in step 545 from the factory floor testing 220, and to the suitable transfer functions (e.g., $H_{xz1}$, $H_{xr1}$, and $H_{xb1}$) supplied from the results of the determination step 530. This prediction step 550 is preferably carried out in a computer (e.g., computer 240), which makes the prediction available to quality control 250.

In step 555, the prediction (e.g., a predicted first harmonic of tangential force variation at a speed of 140 Kph) is compared to predetermined quality criteria (e.g., a maximum acceptable value for the first harmonic of tangential force variation at a speed of 140 Kph), resulting in quality control decisions which are carried out by quality control 250 in step 560.

In step 560, generally controlled by known quality control algorithms in a networked factory computer (e.g., computer 240), a quality control device and/or computer (e.g., quality control device 250) controls tire production by means including accepting or rejecting the production tire 215, thereby producing an accepted tire 570a (compare 270a) or a rejected tire 570b (compare 270b). In step 560, the quality control process 250 optionally also provides feedback to the tire assembly process 210 (step 510) in order to make corrections (e.g., manufacturing machine adjustments) based on the results of comparing the prediction to predetermined quality criteria in step 555.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for predicting a harmonic component of force variation comprising the steps of:
    collecting a first set of measurement data for a tire sample on a factory floor balance checker and on a factory floor tire uniformity machine which is operated at a first speed;
    collecting a second set of measurement data for the tire sample on a test lab tire uniformity machine which is operated at a second speed higher than the first speed;
    determining transfer functions from the first set of measurement data and the second set of measurement data;
    collecting a third set of measurement data for a production tire on a factory floor balance checker and on a factory floor tire uniformity machine; and
    predicting the harmonic component of force variation for the production tire rotating at a prediction speed by applying the transfer functions to the third set of measurement data.

2. A method according to claim 1, characterized by the step of:
    selecting the second speed to be approximately equal to the prediction speed.

3. A method according to claim 1, characterized by the step of:
    selecting the tire sample as a sample set of one or more tires selected from tire production after tire assembly.

4. A method according to claim 1, characterized by the step of:
    selecting the tire sample as a sample set of one or more tires of the same construction which is substantially the same as the construction of the production tire for which prediction is desired.

5. A method according to claim 1, characterized by the step of:
    collecting the first set of measurement data on a factory floor balance checker which determines single plane balance in terms of single plane net imbalance mass and rotational angular location of the net imbalance mass.

6. A method according to claim 1, characterized by the step of:
    collecting the first set of measurement data on a factory floor balance checker which determines two plane balance in terms of a net imbalance mass and rotational angular location of the net imbalance mass for each of two circumferential planes of the tire being balance checked.

7. A method according to claim 1, characterized by the step of:
    providing a tire zero-degree reference mark on each sample tire and on each production tire for maintaining consistent rotational angular references in the measurement data collected from the tire uniformity machines and the balance checker.

8. A method according to claim 1, characterized by the step of:
    collecting the third set of measurement data for the production tire on the same factory floor balance checker and on the same factory floor tire uniformity machine as were used for collecting the first set of measurement data for the tire sample; and
    collecting the third set of measurement data while operating the factory floor tire uniformity machine at the first speed.

9. A method of manufacturing tires comprising the steps of:
    collecting a first set of measurement data for a tire sample on a factory floor balance checker and on a factory floor tire uniformity machine which is operated at a first speed;
    collecting a second set of measurement data for the tire sample on a test lab tire uniformity machine which is operated at a second speed higher than the first speed;
    determining transfer functions from the first set of measurement data and the second set of measurement data;
    collecting a third set of measurement data for a production tire on a factory floor balance checker and on a factory floor tire uniformity machine;
    predicting a harmonic component of force variation for the production tire rotating at a prediction speed by applying the transfer functions to the third set of measurement data;
    comparing the predicted harmonic component of force variation for the production tire to predetermined criteria; and
    controlling the manufacturing of production tires in response to the comparison.

10. A method according to claim 9, characterized by the step of:
   selecting the second speed to be approximately equal to the prediction speed.

11. A method according to claim 9, characterized by the step of:
   selecting the tire sample as a sample set of one or more tires selected from tire production after tire assembly.

12. A method according to claim 9, characterized by the step of:
   selecting the tire sample as a sample set of one or more tires of the same construction which is substantially the same as the construction of the production tire for which prediction is desired.

13. A method according to claim 9, characterized by the step of:
   collecting the third set of measurement data for the production tire on the same factory floor balance checker and on the same factory floor tire uniformity machine as were used for collecting the first set of measurement data for the tire sample; and
   collecting the third set of measurement data while operating the factory floor tire uniformity machine at the first speed.

14. Apparatus for controlling tire manufacturing, comprising:
   factory floor testing equipment comprising a low speed tire uniformity machine and a balance checker for measuring tires after tire assembly;
   test lab testing equipment comprising a high speed tire uniformity machine;
   a computer for collecting measurement data from the factory floor testing equipment and from the test lab testing equipment, for determining transfer functions and for predicting a harmonic component of force variation; and
   a quality control device for accepting and rejecting production tires based on a harmonic component of force variation predicted for the production tires.

15. Apparatus according to claim 14, characterized in that:
   the quality control device provides feedback for correcting the tire assembly process.

16. Apparatus according to claim 14, characterized in that:
   the factory floor balance checker is selected from devices capable of measuring single plane balance and devices capable of measuring two plane balance.

17. Apparatus according to claim 14, characterized in that:
   the factory floor testing equipment and the test lab testing equipment are able to determine rotational angular position with reference to a zero-degree reference mark on a tire being tested.

* * * * *